June 30, 1942.                L. BOMYER                2,288,223
                         BOILER CONTROL APPARATUS
                          Filed May 13, 1940           3 Sheets-Sheet 1

Inventor
L. BOMYER
by Blair + Kilcoyne
Attorneys

June 30, 1942.   L. BOMYER   2,288,223
BOILER CONTROL APPARATUS
Filed May 13, 1940   3 Sheets-Sheet 2
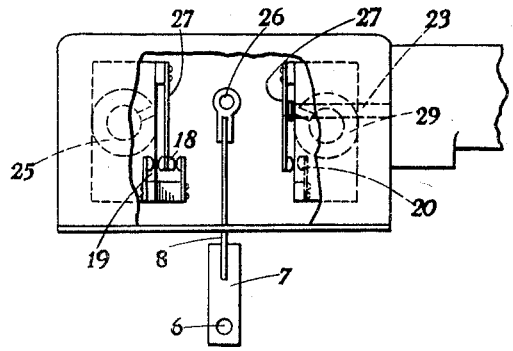
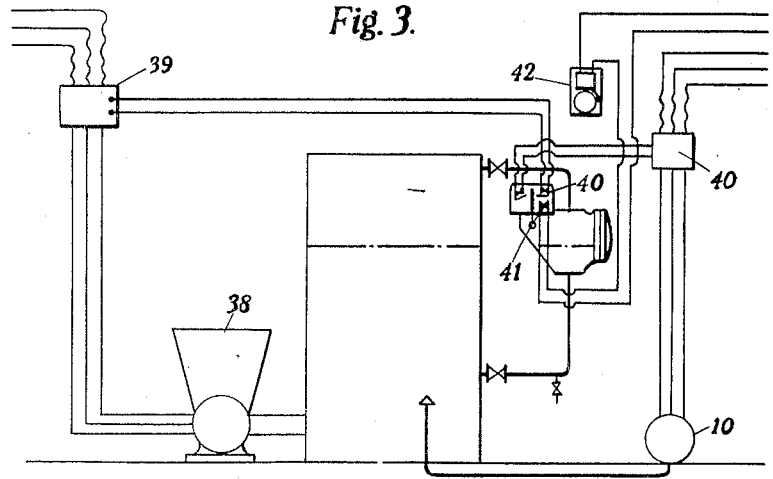
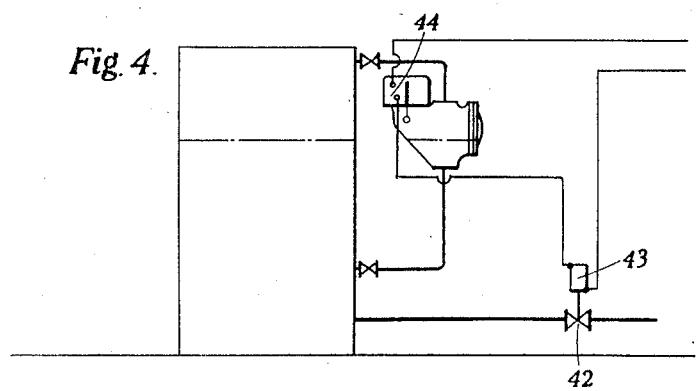
Inventor
L. BOMYER
by Blair + Kilcoyne
Attorneys Inventor
L. BOMYER
by Blair + Kilcoyne
Attorneys Patented June 30, 1942

2,288,223

UNITED STATES PATENT OFFICE 2,288,223

BOILER CONTROL APPARATUS

Leonard Bomyer, Slough, England, assignor to Ronald Trist & Co. Limited, Slough, England, a British company Application May 13, 1940, Serial No. 334,930
In Great Britain May 19, 1939

12 Claims. (Cl. 122—448)

The supply of feed water to a steam boiler is commonly controlled by a float provided in a chamber separate from but in communication with the interior of the boiler. When the water level in the boiler rises, the float rises and operates control means through which the feed water supply is controlled; for example a pump supplying the feed water may be stopped. Now the level of the water in the boiler usually fluctuates practically continuously, so that if the feed water pump is electrically driven and controlled and the control means comprises a switch in the electric circuit, the float may cause this switch to open and close at short intervals when the liquid is in the neighborhood of the critical level, which is of course undesirable. Similarly, in other plants including containers for liquid the performance or initiation of an operation or sequence of operations dependent upon the liquid level in the container may be effected by the movement of control means. The main object of the invention is to eliminate for practical purposes the effect of minor fluctuations around a critical liquid level in any such plant.

Essentially the desired result is attained by making a member moved by a float in accordance with the liquid level carry or form an armature which, on the liquid level coming into the critical position, is brought so far into the field of a magnet that it is moved through a further distance with snap action and thereupon actuates the control means. In general the control means comprises an electric switch or a relay device. The armature may be fixed to the end of a blade spring carried by a shaft which rocks about its own axis as the float moves up and down, so that on the approach to the limiting position the magnetic attraction is exerted against the force of the spring and when it overcomes the spring the armature snaps over towards, and preferably into contact with, the magnet.

In a steam boiler plant, the limiting position referred to above may correspond to the upper critical liquid level, at which stage it is desirable that the feed water supply should be cut off or reduced. The limiting position may alternatively correspond to the lower critical liquid level at which it is desirable to cut off or reduce the supply of fuel to the means used for heating the boiler. It is very often desirable to control both the feed water and the fuel in a steam boiler plant, and, in the preferred construction according to the invention, two magnets are provided between which the armature moves and the positions of which correspond to the upper and lower critical levels respectively.

Although it is actually desirable to work with not more than two critical liquid levels, the invention also makes it possible to arrange any number of such levels, by having a series of magnets such that the armature tends to stay at a fixed point in each magnetic field, until the force exerted by the float is enough to move the armature from each point of maximum intensity.

The invention will be most readily understood by reference to the accompanying drawings, in which:

Figure 2 shows in more detail a magnetic switch shown in Figure 1; and

Figures 3 to 6 are diagrams illustrating other methods of controlling the operations of the plants.

Figure 1:
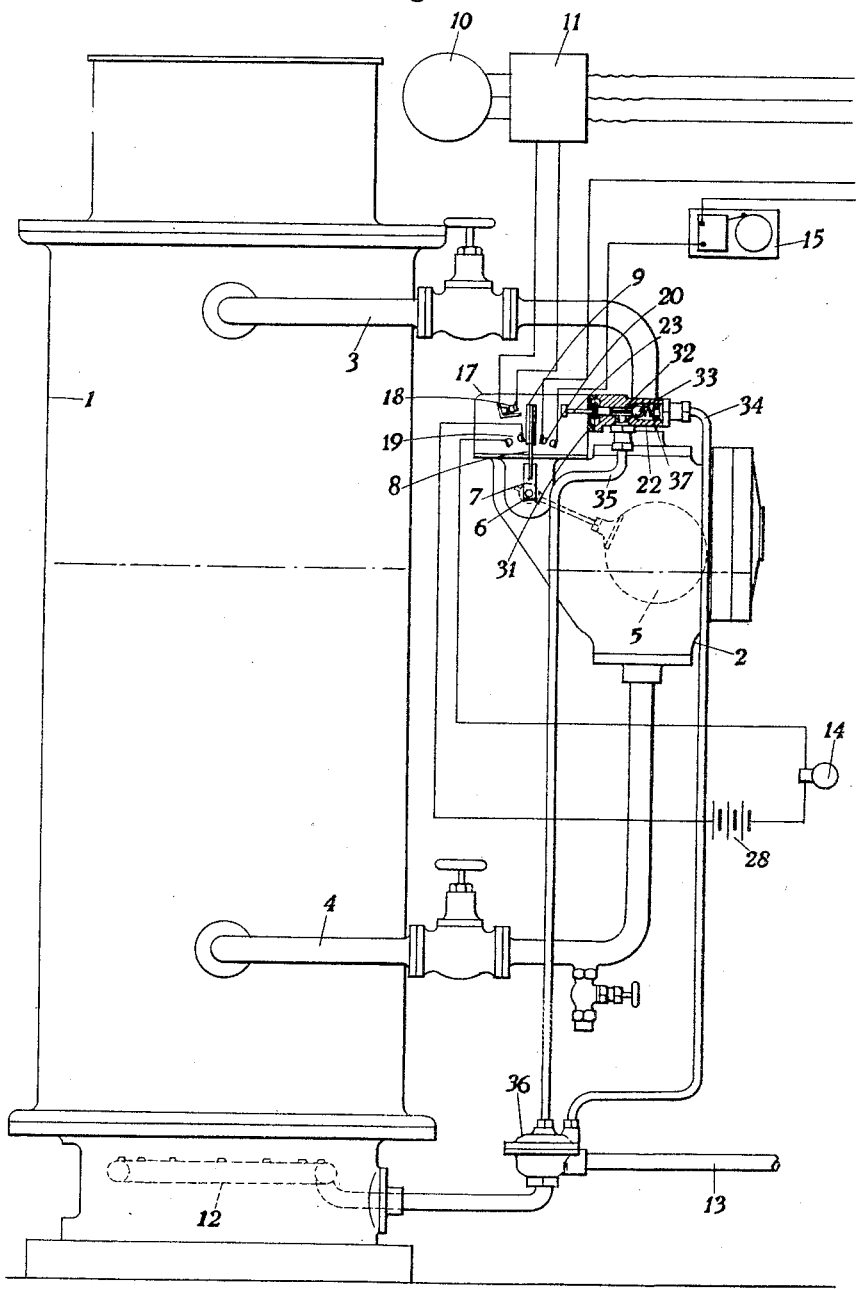
Figure 1 shows one boiler and controlling mechanism, and also purely diagrammatically the controlled parts and electrical connections to them.

Referring first to Figures 1 and 2, the steam and water spaces of a boiler 1 are connected respectively to the top and bottom of a closed container 2 by pipes 3 and 4. A float 5 is provided in the container 2 and is carried by a shaft 6 which projects through the wall of the container and rocks about its own axis as the float moves up and down in accordance with the liquid level in the container. This level is shown by a chain line and is of course the same as the liquid level in the boiler. Outside the container 2 the shaft 6 carries an arm 7, to which is fixed a blade spring 8, which in turn carries at its upper end an armature 9. Thus as the liquid level rises the float moves the armature to the left and as it falls it moves it to the right.

The plant is supplied with feed water by a unit 10, consisting of a pump driven by an electric motor, and the operation of the motor is controlled by a starter 11. The boiler is heated by a gas burner 12, to which gas is supplied by a pipe 13. When the liquid reaches an upper critical level, it is necessary to stop the feed water pump and this is done by breaking the circuit of the starter 11. At the same time a lamp 14 is illuminated and may show a red light to warn the operator that the pump is not running. When the liquid reaches the lower critical level, it is necessary to shut off the supply of gas to the burner 12 and at the same time an alarm bell 15 is rung.

In order to perform these various functions, a magnetic switch 17 is provided, and the armature 9 constitutes part of this switch. The switch actuates four control members, namely, three pairs of switch contacts, 18, 19 and 20, all forming part of it, and a plunger 23 forming part of a relay device 22. This relay device is a valve which is opened when the plunger 23 is moved to the right.

Assuming that the liquid level in the boiler is merely fluctuating between the two critical levels, the armature 9 moves freely without operating any of the contacts of the switch 17 and without moving the plunger 23 to open the valve 22. When, however, the upper critical level is reached, the armature 9 is moved so far to the left as to be brought sufficiently into the field of a magnet 25, forming part of the switch 17, that it moves further to the left with snap action. As it does this two arms 26 which it carries bear against blade springs 27 which carry the right-hand contact member of the contacts 19 and the left-hand contact member of the contacts 18. The contacts 18 are biassed to close and they are opened by the movement of the armature, so that the circuit including the motor starter 11 is broken and the motor is stopped. The contacts 19 are biassed to open and they are closed by the movement of the armature, so that a circuit including the lamp 14 and battery 28 is closed and the lamp is lit. The resilience of the blade spring 8 together with the pull of the magnet 25 allows the armature 9 to stay in its extreme left-hand position until the liquid level has fallen sufficiently to flex the blade 8 to overcome the magnetic pull, at which stage the armature 9 will leave the magnet 25 with a snap action, causing the contacts 18 and 19 to resume their normal positions. Thus, minor fluctuations around the upper critical level do not bring the pump into operation again. If now the water in the boiler continues to fall and reaches the lower critical level, the armature will be brought far enough into the field of another magnet 29, also forming part of the switch 17, to move further to the right with snap action, thereby causing the two arms 26 to operate the contacts 20 and the valve 22. The contacts 20 are biassed to open so that they are closed when the armature moves to the right, and thus a circuit including the bell 15 is closed and the bell rings. In the valve 22 the plunger 23 is moved to the right and acts through a diaphragm 31 and a distance piece 32 on a ball valve 33 which is moved off its seating and, in so doing, places two pipes 34 and 35 in communication with one another. The pipe 34 is a branch pipe from the gas supply pipe 13, so gas flows through the pipes 34 and 35 and acts on a diaphragm forming part of a valve 36 placed in the pipe 13 between the pipe 34 and the burner 12. When the gas pressure is supplied to the diaphragm the valve 36 closes, that is to say, shuts off the supply of gas to the burner 12. When the armature 9 moves to the left again, and the pressure exerted by the arm 26 is released, a spring 37 returns the ball 33 to its seat.

In the plant shown in Figure 3, the boiler is heated by solid fuel supplied by an automatic stoker 38 driven by a motor controlled by a starter 39. Feed water is supplied by a pump unit 10, the motor of which is controlled by a starter 11. When the float rises and the armature 9 moves to the left, the feed pump is stopped in the same way as in Figure 1. When the water reaches the lower critical level and the armature moves to the right, contacts 40, which are biassed to close, are opened so that the stoker 38 is stopped. At the same time contacts 41 in the circuit of a bell 42 are closed to cause the bell to ring.

In the plant illustrated in Figure 4, the supply of feed water is cut off when the upper liquid level is reached by means of a valve 42 actuated by a solenoid 43, the circuit of which is closed by the closing of a pair of contacts 44.

Figure 5:
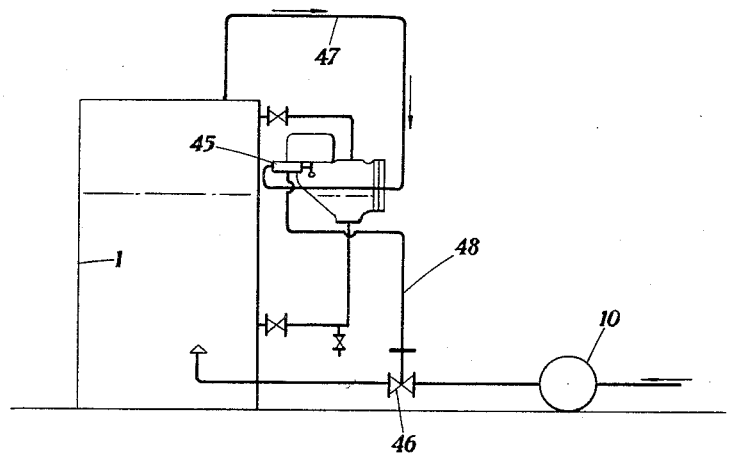

In the plant illustrated in Figure 5, a relay valve 45, similar in construction to the valve 22, is provided and it controls the flow of steam from the boiler 1 to a diaphragm-operated valve 46 in the feed water supply pipe. This arrangement may be used, for example, when the pump unit 10 is supplying water to more than one boiler. The relay valve 45 is opened when the armature of the magnetic switch snaps over to the left and steam is then allowed to flow through a pipe 47, the valve 45 and a pipe 48 so that it acts on the diaphragm of the valve 46 and closes this valve.

Figure 6:
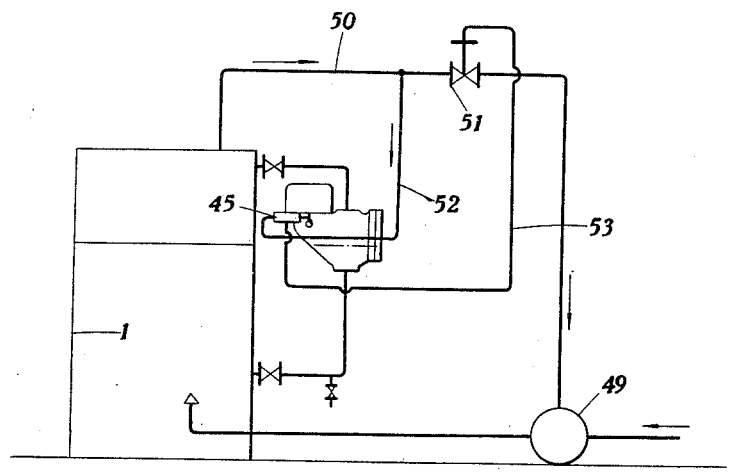

In the plant shown in Figure 6 a feed water pump 49 is driven by steam from the boiler 1. This steam passes through a pipe 50, which contains a diaphragm-operated valve 51 which is shut when the water in the boiler reaches the upper critical level. As in the plant shown in Figure 5, a relay valve 45 is provided, and when the armature snaps over to the left this allows steam to flow from the pipe 50 through a pipe 52 and another pipe 53 to the valve 51.

I claim:

1. A steam boiler plant, comprising, in combination, a boiler, means for heating said boiler, control means arranged upon actuation at least to reduce the supply of fuel to said heating means, a float mounted to rise and fall with the liquid level in said boiler, a resiliently mounted armature connected directly with said float and arranged to actuate said control means mechanically as the float ascends, and a magnet towards and from which the armature moves operative to cause said armature to move with snap action on arriving at a position corresponding to the lower critical level in said boiler thereby to accelerate and make more positive the mechanical actuation of said control means by said armature.

2. A steam boiler plant as defined in claim 1, wherein said heating means comprises a firing plant and an electric motor for driving said firing plant, and said control means comprises an electric switch in a control circuit for said motor.

3. A steam boiler plant as defined in claim 1, wherein said heating means comprises a fluid burner, a fluid supply pipe and a control valve in said fluid supply pipe, and said control means comprises a valve arranged to permit fluid from said supply pipe to close said first-mentioned valve.

4. A steam boiler plant as defined in claim 1, and additional control means arranged to be actuated by said armature simultaneously to control the liquid level in the boiler.

5. A steam boiler plant as defined in claim 1, and additional control means arranged to be actuated simultaneously with said fuel supply control means.

6. A steam boiler plant comprising, in combination, a boiler, means for supplying feed water to said boiler, means for heating said boiler, first control means arranged upon actuation at least to reduce the supply of said feed water, second control means arranged upon actuation at least to reduce the supply of fuel to said heating means, a float mounted to rise and fall with the liquid level in said boiler, an armature connected to move with said float and arranged in one position mechanically to actuate said first control means and in another position mechanically to actuate said second control means, and two magnets arranged one on each side of said armature, one of said magnets being operative to cause said armature to move with a snap action on arriving at a position corresponding to the upper critical liquid level in said boiler and thus effective to accelerate and make more positive the mechanical actuation of said first control means, and the other of said magnets being operative to cause said armature to move with snap action in the opposite direction on arriving at a position corresponding to the lower critical level in said boiler and thus effective to accelerate and make more positive the mechanical actuation of said second control means.

7. A steam boiler plant, comprising in combination, a boiler, means for supplying feed water to said boiler, control means arranged upon actuation at least to reduce the supply of said feed water, a float mounted to rise and fall with the liquid level in said boiler, a resiliently mounted armature connected directly with said float and arranged to actuate said control means mechanically, and a magnet towards and from which said armature moves with snap action on arriving at the position corresponding to the upper critical liquid level in said boiler thereby to accelerate and make more positive the mechanical actuation of said control means by said armature, said feed water supply means comprising a control valve, said control means comprising a valve arranged to permit steam from said boiler to close said first-mentioned valve.

8. A steam boiler plant comprising, in combination, a boiler, feed water control therefor, fuel feed control therefor, a float mounted to rise and fall with the liquid level in said boiler, an armature connected to move with said float and arranged in one position mechanically to actuate said first control means and in another position mechanically to actuate said second control means, and two magnets arranged one on each side of said armature, one of said magnets being operative to cause said armature to move with a snap action on arriving at a position corresponding to the upper critical liquid level in said boiler and thus effective to accelerate and make more positive the mechanical actuation of said first control means, and the other of said magnets being operative to cause said armature to move with snap action in the opposite direction on arriving at a position corresponding to the lower critical level in said boiler and thus effective to accelerate and make more positive the mechanical actuation of said second control means.

9. A steam boiler plant comprising, in combination, a boiler, a float associated therewith and moved in accordance with the liquid level in said boiler, a plurality of control means to be actuated, a flat spring connected to move with said float and an armature carried thereby arranged under the control of said float to actuate said control means mechanically and simultaneously and a magnet operative to cause said armature to move with a snap action on arriving at a position corresponding to a critical liquid level and thus effective to accelerate and make more positive the mechanical actuation of said control means by said armature.

10. A steam boiler plant comprising, in combination, a boiler, a fluid supply means for said boiler, control means for the supply arranged upon actuation to reduce the supply, a float mounted to rise and fall with the liquid level in said boiler, a rock shaft upon which the float is mounted, a resilient arm connection mounted upon said rock shaft thereby to oscillate as the shaft is turned by the rise and fall of the float, a plurality of contacts, an armature resiliently carried by said arm and separate from said contacts but operative to engage said contacts and thereby to open or close said contacts, and a magnet adjacent the contacts operative to move said armature with a snap action in one direction when the armature has moved within the magnetic field of influence and to permit release of the armature from the magnet with a snap action when the resiliency of the spring arm is greater than the magnetic pull when the armature has been urged away from the magnet, thereby to accelerate and make more positive the mechanical actuation of said contacts and control means by said armature.

11. A steam boiler plant as set forth in claim 10, in which some of said contacts control the supply of fuel and others the feed of water to the boiler.

12. A steam boiler plant as set forth in claim 10, including a signal device associated therewith adapted to be actuated by some of said contacts.

LEONARD BOMYER.